(12) United States Patent
Stava

(10) Patent No.: US 7,220,940 B2
(45) Date of Patent: May 22, 2007

(54) SYSTEM FOR WELDING WITH MULTIPLE ARCS

(75) Inventor: Elliott K. Stava, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 385 days.

(21) Appl. No.: 11/012,559

(22) Filed: Dec. 16, 2004

(65) Prior Publication Data
US 2006/0131290 A1 Jun. 22, 2006

(51) Int. Cl.
B23K 9/10 (2006.01)
(52) U.S. Cl. .................................... 219/130.1
(58) Field of Classification Search ............. 219/130.1, 219/130.31, 130.32, 130.33, 130.51, 137 PS
See application file for complete search history.

(56) References Cited

U.S. PATENT DOCUMENTS

| 967,578 | A | 8/1910 | Siemund |
|---|---|---|---|
| 1,619,629 | A | 3/1927 | Owen |
| 2,417,907 | A | 3/1947 | Bowen, Jr. et al. |
| 3,566,072 | A | 2/1971 | Pierce |
| 3,911,243 | A | 10/1975 | Moriyama et al. |
| 4,553,018 | A | 11/1985 | Kondo et al. |
| 6,051,810 | A | 4/2000 | Stava |
| 6,111,216 | A | 8/2000 | Stava |
| 6,207,929 | B1 | 3/2001 | Stava |
| 6,362,986 | B1 | 3/2002 | Schultz et al. |

FOREIGN PATENT DOCUMENTS

| EP | 0 538 227 A | 4/1993 |
|---|---|---|
| EP | 1 600 238 A | 11/2005 |
| GB | 282 527 A | 12/1927 |
| SU | 460957 | 4/1975 |

OTHER PUBLICATIONS

European Search Report, EP 05 01 1923 Munich, Mar. 22, 2006, Jeggy, T.

Primary Examiner—Clifford C. Shaw
(74) Attorney, Agent, or Firm—Fay Sharpe LLP

(57) ABSTRACT

A system for welding with a first and second arc between a first and second electrode, respectively, and a common workpiece, where each of the electrodes is driven by a power lead from a single power source. The system comprises an inductor with a core, a center tap, a first end, a second end, a first coil section between the tap and the first end and a second coil section between the tap and the second end where the power lead is connected to the tap. A first circuit connecting the first arc in series with the first coil section and a second circuit connecting the second arc in series with the second coil section, a first separate auxiliary inductor in the first circuit between the first coil section and the first arc and a second separate auxiliary inductor in the second circuit between the second coil section and the second arc.

37 Claims, 4 Drawing Sheets

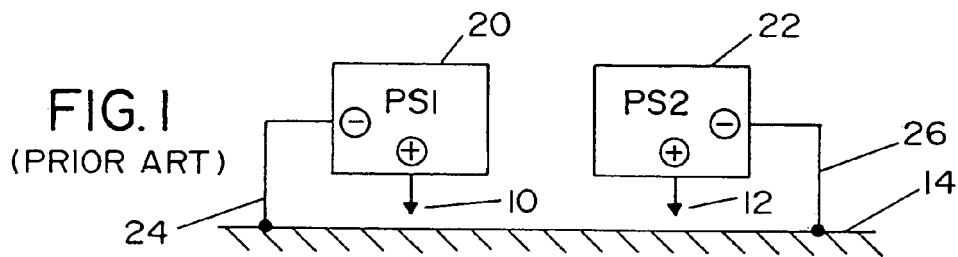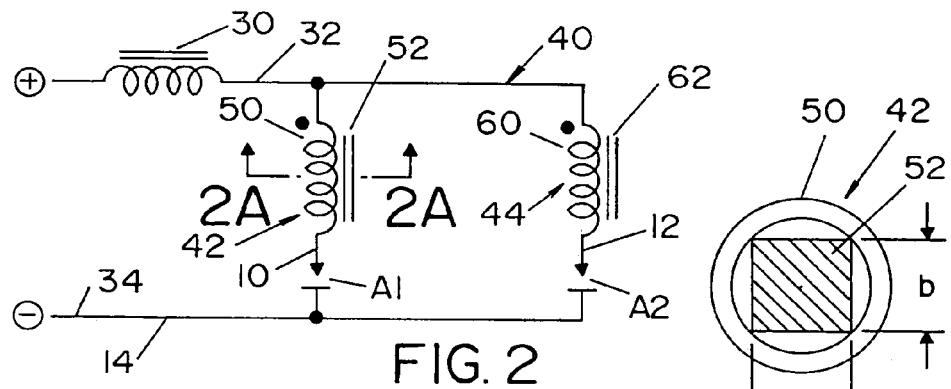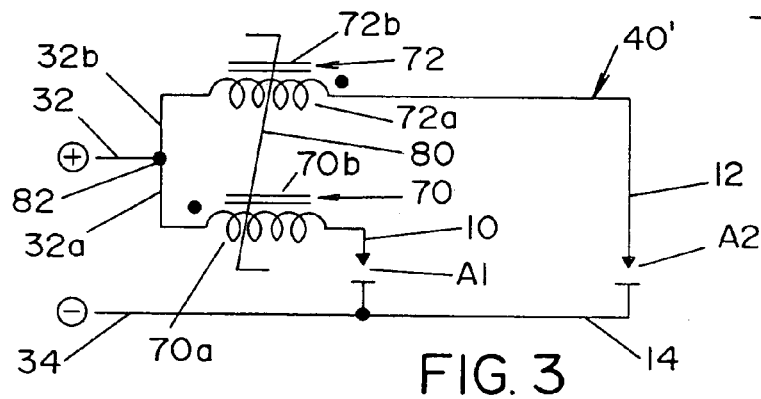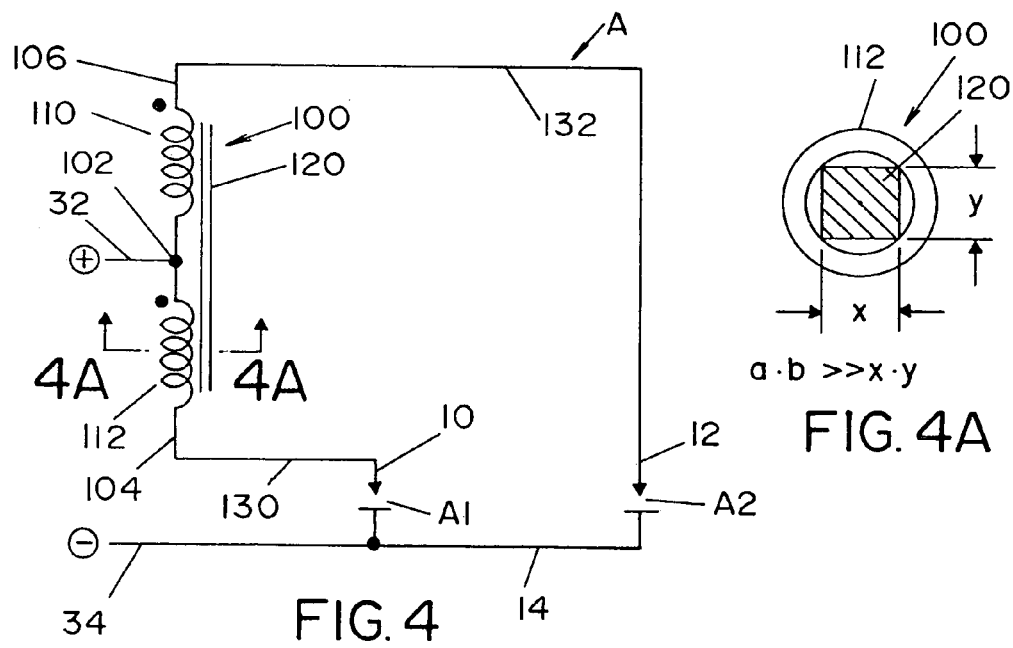

SYSTEM FOR WELDING WITH MULTIPLE ARCS

The present invention relates to the field of electric arc welding and more particularly to a system for DC or AC welding with multiple arcs.

INCORPORATION BY REFERENCE

Electric arc welding of pipe sections generally involves an automatic welding operation wherein two or more electrodes are moved in unison along a path in the space between the two pipe sections, hereinafter referred to as the workpiece. The first electrode is melted to lay a bead that fills the root gap between the pipe sections. Subsequent electrodes are melted and deposit molten metal in successive layers to fill the gap between the pipe sections and, thus, finalize the welded pipe joint. The use of multiple electrodes to create multiple arcs in an automatic welding operation involves the use of a separate power source for each of the electrodes arranged in tandem and moved in unison. This well known technology is contained in several patents, such as Stava U.S. Pat. No. 6,207,929 incorporated by reference herein as background information. By using individual power sources to drive the arc between each electrode and the workpiece, each arc is independently controlled by its dedicated power source. The present invention relates to a system using a center tapped choke, which is a component often used by The Lincoln Electric Company of Cleveland, Ohio and disclosed in several patents such as Stava U.S. Pat. No. 6,051,810 incorporated by reference herein as background information. The two Stava patents show existing technology to which the present invention is directed and, more specifically, a center tapped choke as used in the present invention. Consequently, there is no need to discuss the details of the prior art tandem operated electrodes or the details of a center tapped choke in the output of a power source for welding.

BACKGROUND OF INVENTION

When using multiple arcs, such as an automatic welding process having tandem arranged electrodes, it has become common practice to use a separate power source for each electrode used to create an arc for the welding process. Such system and method is expensive and involves substantial space and weight, especially when the power sources must be moved around a pipe during the welding operation. To reduce the cost and weight for automatic welding with two or more arcs, a single power source has been suggested where a choke mounted interior of the power source limits the amount of current flow, especially when one of the arcs is inadvertently shorted. This solves the excessive current problem; however, there is a more basic problem. When there is a short circuit of one arc, all current from the power source to the choke is directed to the electrode that is short circuited. Consequently, the arc or arcs associated with the other electrodes are extinguished and must be restarted when the short circuit is cleared. To alleviate this problem, often the tandem electrode arrangement is operated in a spray mode to minimize inadvertent short circuits and, thus, eliminates the problem of a short circuit in one arc extinguishing the other arcs. This solution to the problem drastically reduces the versatility of the welding operation using tandem electrodes in an automatic welding process.

STATEMENT OF INVENTION

The present invention involves a system of arc welding with multiple arcs, where the process need not be limited to spray welding, but a short circuit of one arc does not extinguish the other arcs in a grouping of tandem arranged electrodes. In accordance with the invention, there is provided a system for welding with first and second arcs between a first and second electrode, respectively, and a workpiece common to all electrodes. The common workpiece can be spaced sections of pipe being joined by melting the first and second electrodes in sequence as they are moved in unison. In this system, the electrodes are driven by a single power source using a center tapped choke in the output. A first inductor or coil section is connected in series with the first electrode and a second inductor or coil section is connected in series with the second electrode. In this manner, when one electrode is short circuited to the workpiece, the other arc or arcs are sustained for a period of time determined by the inductive reactance of the inductor or inductors in series with each electrode. The preferred arc sustaining time is in the general range of 1.0 ms to 10 ms and is preferably in the general range of 4.0–6.0 ms. In accordance with the present invention, the inductor for the separate arcs is wound on a single or common core in the form of a center tapped choke of the type generally shown in Stava U.S. Pat. No. 6,051,810. Each electrode is in series with one or more inductors where the inductors are each coil sections of a center tapped choke.

In accordance with the invention, a center tapped choke as shown in Stava U.S. Pat. No. 6,051,810 is provided with a first separate auxiliary inductor connecting one end of the choke to a first arc and a second separate auxiliary inductor connecting the second end of the choke to the second arc. Thus, the series circuit driving both arcs includes a coil section from the center tapped choke together with a separate auxiliary inductor to control the total inductance in the series circuit driving both the first and second arc. In accordance with another aspect of the invention, a freewheeling diode is connected in parallel with each auxiliary inductor and its associated arc. The freewheeling diodes act in accordance with standard freewheeling diodes to control the current flow through the arc at polarity changes. Still a further aspect of the invention is provision of adjustable inductance for each auxiliary inductor to control the actual dynamics of the arc during normal welding prior to the time that there is a short circuit that utilizes the stored energy in the inductance of the unshorted arc to maintain the stability of the unshorted arc. Thus, a standard center choke output for two or more arcs can be designed for a given power source. If different inductive reactance is needed, only the auxiliary inductors need to be changed. This reduces the cost of the output circuit and allows use of a generally standard center tapped inductor.

To minimize the inconsistent weld caused by one arc short circuiting and thereby extinguishing another arc, the present invention provides an inductor, in the form of one or more sections, in series with each of the arcs. These inductor sections are wound on cores with the proper core material, air gap, cross sectional area and conductor turns, such that the inductive reactance in series with each arc stores enough energy to maintain the arc at the end of the electrode to which the inductor section or sections are connected. The inductance of each series circuit is the inductance of one coil section of a center tapped choke and the inductance of an auxiliary inductor. The two inductors of each series circuit of a given arc are sized to provide enough energy to maintain an arc for a period of approximately 1.0–10.0 ms and preferably about 4.0–6.0 ms. This time is based upon the normal short circuit time experienced in welding processes, wherein the short circuit generally lasts for less than 5.0 ms. The individual inductors in series with the electrodes are sized to accommodate a variety of short circuiting times. The term "inductor" means one or more coil sections in series with one coil on a center tapped choke and the other coil forming an auxiliary inductor.

The concept of individual inductors or inductive reactance in series with each arc is simplified by utilizing a center tapped inductor sometimes referred to as a "choke." A single power source is connected to the center tap and each winding of the inductor is connected to an arc through an auxiliary inductor to insert one or more inductors in series with each arc. A center tapped choke is used so current flow through the center tap and through one winding to the arc tends to cause the flux in the core to be minimized. As current flows through the center tap and through the opposite windings or coil sections, the flux in the core is cancelled. This flux cancelling effect is a reason for preferring the use of a center tapped choke, instead of separate chokes or inductors. By using a center tapped choke and a balanced number of turns, the core stays nearly balanced during normal operation with a like current through each coil section. Consequently, a smaller core is required for a center tapped choke as compared to merely individual inductors for each arc with such inductors having their own separate cores. With the center tapped choke and separate auxiliary inductors for each arc, the advantage of a center tapped choke is combined with control of the series inductance to control the stability of each arc without requiring a special center tapped inductor for each installation.

The primary object of the present invention is the provision of a system, which system uses an inductive reactance in series with each electrode of a multiple arc welding operation so short circuiting of one arc will not immediately extinguish the other arcs, where the inductance reactance is the summation of a coil section from a center tapped choke and a dedicated separate auxiliary inductor.

Another object of the present invention is the provision of a system, as defined above, which system can be easily used on a standard power source for driving a series of electrodes moved in unison in an automatic welding process and where a standard center tapped choke can be employed for differing installations.

Still a further object of the present invention is the provision of a system, as defined above, which system allows the use of a single power source for a welding process involving two or more parallel arcs.

Still a further object of the present invention is the provision of a system, as defined above, which system can be used in a variety of welding processes and with both DC and AC welding currents.

These and other objects and advantages will become from the following description taken together with the accompanying drawings.

BRIEF DESCRIPTION OF DRAWINGS

FIG. 1 is a wiring diagram schematically illustrating a prior art system to which the present invention is directed;

FIG. 2 is a wiring diagram illustrating the broad concept of the present invention;

FIG. 2A is an enlarged cross-sectional view taken generally along line 2A—2A of FIG. 2;

FIG. 3 is a wiring diagram illustrating a center tapped output choke as used in the present invention with separate cores for the inductors with the cores transformer coupled with each other;

FIG. 4 is a wiring diagram of a center tapped choke to be used in the present invention;

FIG. 4A is an enlarged cross-sectional view taken generally along line 4A—4A of FIG. 4;

PREFERRED EMBODIMENT

Figure 5:
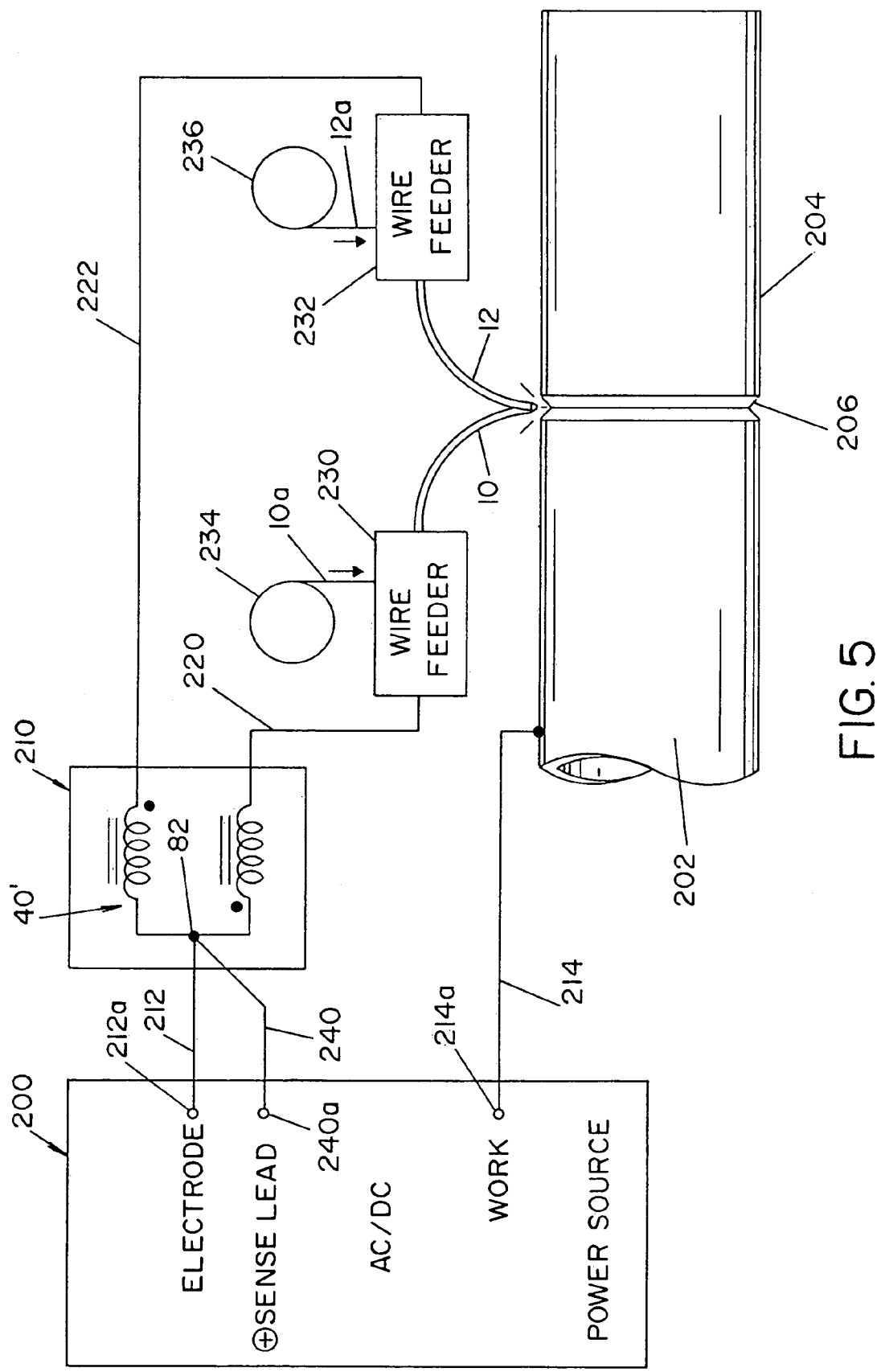
FIG. 5 is a pictorial and schematic view illustrating a field application of a center tapped choke used for pipe welding.

In Stava U.S. Pat. No. 6,207,929 two tandem arranged electrodes move in unison and are driven by separate power sources. Such system is schematically illustrated as prior art in FIG. 1 where tandem electrodes 10, 12 create parallel arcs with workpiece 14 and are connected to a first power source 20 and a second power source 22, respectively. Leads 24, 26 connect the power sources to the workpiece, which can be the two spaced ends of pipe sections. The present invention involves a welding process using at least two electrodes, such as electrodes 10 and 12, driven by a single power source. In the past, a system using a single power source for multiple arcs often included a choke 30 as shown in FIG. 2. This choke was connected to the parallel arcs of electrodes 10 and 12 to limit current when one of the electrodes 10, 12 was shorted. However, the common choke did not prevent an arc from being extinguished when one of the arcs was shorted. Consequently, a short circuit caused disruption in the weld process and complex restarting techniques. To solve this problem, a center tapped choke output is used as shown in FIG. 2. This choke effectively inserts a separate inductor in series with each arc A1, A2. The single power source is represented by output terminals 32, 34 that are connected by circuit 40 to electrodes 10, 12. Individual inductors or series inductors 42, 44 have inductive reactance controlled by the core material, air gap, cross-sectional area and conductor turns. The inductive reactance of inductors 42, 44 is in series with arc A1 and arc A2. Thus, enough energy is stored in the inductors to maintain one of the arcs associated with one of the electrodes for selected time when essentially no current is directed to the electrode. This diversion of current occurs when one of the arcs is short circuited to workpiece 14. Circuit 40 constitutes the broad theory of the present invention which involves a center tapped choke to stabilize arcs A1, A2. In the simplified concept of FIG. 2, inductors 42, 44 have inductive reactance to sustain an arc when the other arc is short circuited. In accordance with standard technology, inductors or inductive reactance 42, 44 shown in FIG. 2 would be provided with a coil 50, 60 and a center core 52, 62. As illustrated in FIG. 2A, the cross-sectional area of core 52 is the product of width a and height b. This cross-sectional area, together with the number of turns and the material of the core produces sufficient inductive reactance to maintain an arc for at least 10.0 ms and preferably in the general range of 4.0–6.0 ms. In practice, the series inductive reactance is such that arc A1 or arc A2 is sustained for approximately 5.0 ms when the other arc is short circuited. Circuit 40 illustrates the broadest concept of the present invention. One of the arcs A1, A2 is sustained when the other is short circuited. The present invention performs the protective principle of circuit 40 by using a center tapped choke as illustrated in FIG. 3 where circuit 40' includes inductors 70, 72 have windings 70a, 72a and cores 70b and 72b. In accordance with this device for stabilizing arcs A1, A2, the cores shown in FIG. 2 are transformer coupled to each other, as indicated by symbol 80. Thus, lead 32 is branched at center tap 82 into leads 32a, 32b communicated with inductors 70, 72, respectively. The core flux caused by current flow through coils 70a, 72a is in opposite directions to be cancelled out during normal operation of circuit 40'. The center tapped choke system shown in FIG. 3 provides an advantage schematically explained by using the center tapped choke circuit shown in FIG. 4.

Referring now to the center tapped choke system shown in FIG. 4, circuit A for electrodes 10, 12 includes a center tapped choke 100 having center tap 102 connected to lead 32, end 104, end 106 and coils, or inductor sections, 110, 112 wound around a single core 120. This is like cores 70b, 72b of FIG. 3. The center tapped choke or inductor has output leads 130, 132 connected in series with electrodes 10, 12, respectively. Of course, the electrodes are normally welding wire, either cored or solid, provided from a reel and receiving welding current from leads 130, 132 as better shown in FIG. 8. Coil sections 110, 112 of the center tapped choke have the same number of turns so the flux in core 120 caused by the two spaced coils generally cancel each other. The size of core 120, as represented in FIG. 4A, is the product of width x and height y. By using a center tapped choke as in FIG. 4, instead of the individual inductors of FIG. 2, the size of core 120 (x.y) can be drastically less than the size of core 52 (a.b). In practice, the use of a center tap choke allows reduction of the core at least 50% from the cross-section of core 52. This reduction in the core size to obtain the same arc sustaining energy is an advantage of using a center tapped choke. The ability to use a center tapped choke is an advantage of the invention to perform the protective principle broadly illustrated in FIG. 2. The use of a center tapped choke as one component of the invention has the advantage shown by comparing the operation of the cores as shown in FIGS. 2A and 4A. A short circuit at arc A1 or at arc A2 will not extinguish the opposite arc in both systems.

The invention is a circuit component added to the system shown in FIG. 4. A practical use of the center tapped choke based circuit 40' is illustrated in FIG. 5. Power source 200 is used to weld together pipe sections 202, 204 having a separating groove 206 to be welded and filled by electrodes 10, 12 driven by a single power source 200. The electrodes are moved in unison and automatically around groove 206 so that molten metal from electrodes 10 and 12, is directed into groove 206. Metal from the two electrodes welds sections 202, 204 together. The arc sustaining inductors or inductance reactance devices are located in inductor network 210. This network is shown as circuit 40' in FIG. 3, but it can be like circuit 40 of FIG. 2 or circuit A of FIG. 4. Remote inductor network 210 has input lead 212 from power source 200. The lead is connected to terminal 212a. Terminal 214a is connected to output lead 214 forming an electrical connection with the workpiece comprising spaced pipe sections 202, 204. Network 210 uses a center tapped choke and has output leads 220, 222 for directing either AC or DC welding current to parallel electrodes 10, 12 to perform an automatic welding operation as the electrodes are moved in unison. Wire feeders 230, 232 pull electrode wire 10a, 12a, respectively, from supply reels or spools 234, 236, respectively. In accordance with standard control technology a voltage sensing lead 240 at junction 82 of circuit 40' directs the voltage of network 210 back to terminal 240a of power source 200 for the purpose of maintaining the proper welding voltage. FIG. 5 shows a practical implementation of center tapped choke system which is modified in accordance with the present invention to add auxiliary inductors. The operation of the installation shown in FIG. 5 does not change. Each electrode is provided with an inductive reactance in series with a single power source to maintain an arc at the electrode, irrespective of the momentary short circuiting of another arc. The center tapped choke system of FIGS. 2–5 are a component of the present invention and discussions of systems in FIGS. 2–5 are applicable to the invention shown in FIGS. 7 and 8.

Figure 6:
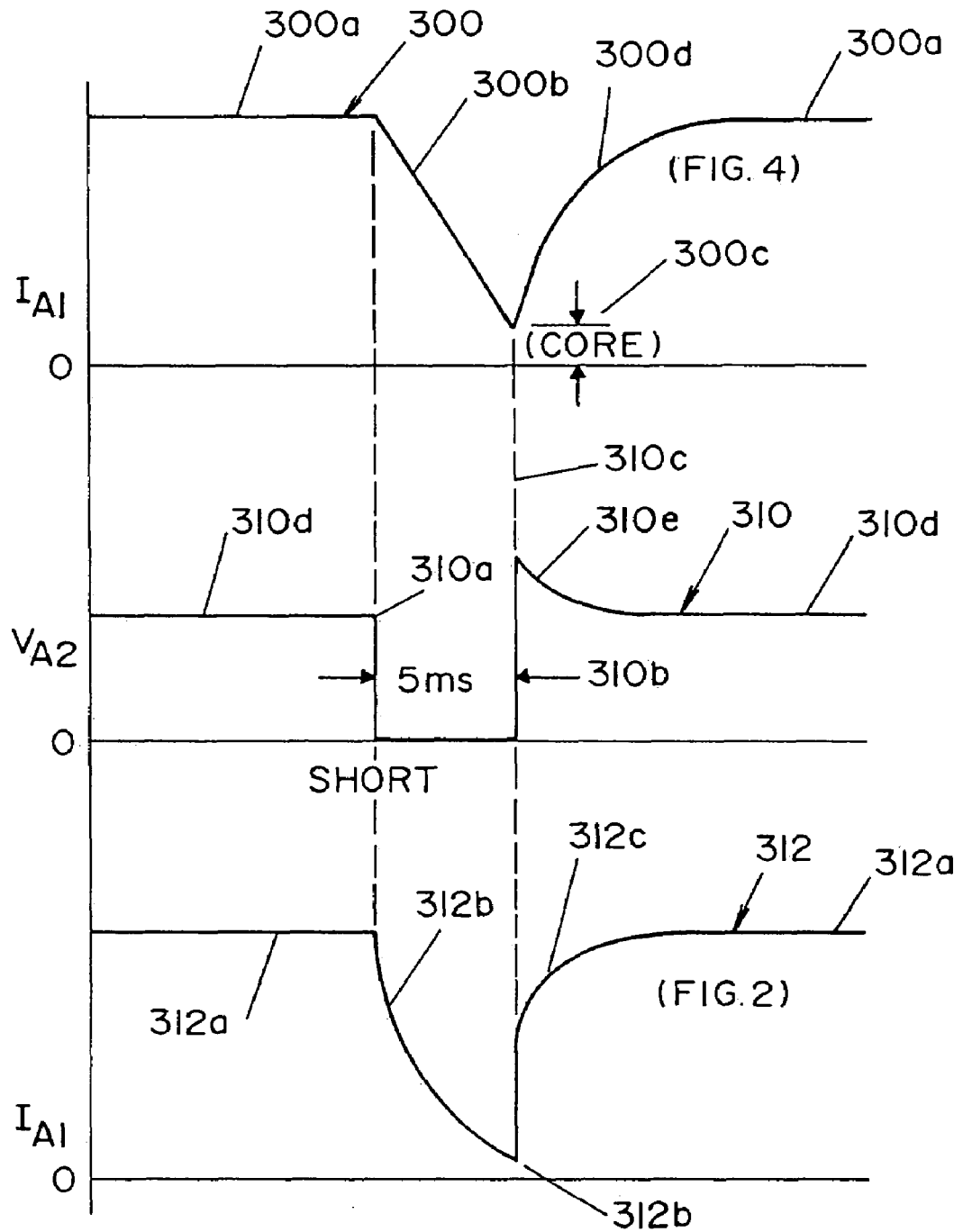
FIG. 6 is a series of curves showing the voltage and current associated with the center tapped choke systems shown in FIG. 2 which curves are developed when using the invention as shown in FIGS. 7 and 8.

Curves 300, 310 and 312 shown in FIG. 6 represent the voltage and current of the electrodes employing the system as shown broadly in FIG. 2 and in the center tapped system of FIG. 4. These same curves explain the operation of the improved center tapped choke system comprising the present invention shown in FIGS. 7 and 8. Curve 310 is the voltage across an arc that is shorted. The arc is indicated to be arc A2. Voltage 310d plunges to near zero at short circuit point 310a and remains low for a time 310b, which time is normally about 5.0 ms. The short circuit is cleared as indicated by point 310c by a standard routine that raises the arc current across the electrode to cause the short to neck and separate. The common short clearing circuit is not a part of the invention and is a well known feature of many welders. In summary, there is a short circuit at point 310a and the short circuit is cleared at point 310c. The voltage level 310d is the controlled voltage level during the welding operation. Spike 310e is the recovery spike occurring when the short circuit breaks abruptly to reestablish arc A2. Curve 300 is the current curve of the non-shorted arc A1 using center tapped choke circuit A of FIG. 4 or inventive center tapped choke system shown in FIGS. 7 and 8. At point 310a, high current is drawn by arc A2. This action reduces the current available for arc A1 so the current through the arc reduces in the straight line slope 300b until it reaches the lower level 300c, when the short circuit is removed. At that time, the current across A1 recovers along time constant curve 300d. The inductive reactance of the core of the center tapped choke in the system in FIG. 4 or the system in FIGS. 7 and 8 controls the slope of line 300b and point or level 300c of current curve 300. This inductive reactance also controls the shape of line 300d. When the two arc sustaining inductors are wound on separate cores, as shown in FIG. 2, then the current of non-short circuited arc 1 is shown as curve 312. The current has an operating level 312a and is reduced along a time constant curve 312b when there is a short circuit of arc A2. When the short is removed, current 312 recovers rapidly and then along a time constant curve 312c. In both instances, there is a certain amount of energy remaining to maintain arc A1 when arc A2 is short circuited. In the system shown in FIG. 2, the current drops to a level 312b, which level is lower than level or point 300c. The lower current level is due to the lack of mutual coupling between the cores of the individual inductors. The curves shown in FIG. 6 illustrate the operating characteristics of the broad theory as represented by circuit 40 shown in FIG. 2. These curves represent operation of a system using a center tapped choke as shown in FIG. 4 or the improved center tapped choke system constituting the invention, as shown in FIGS. 7 and 8.

Figure 7:
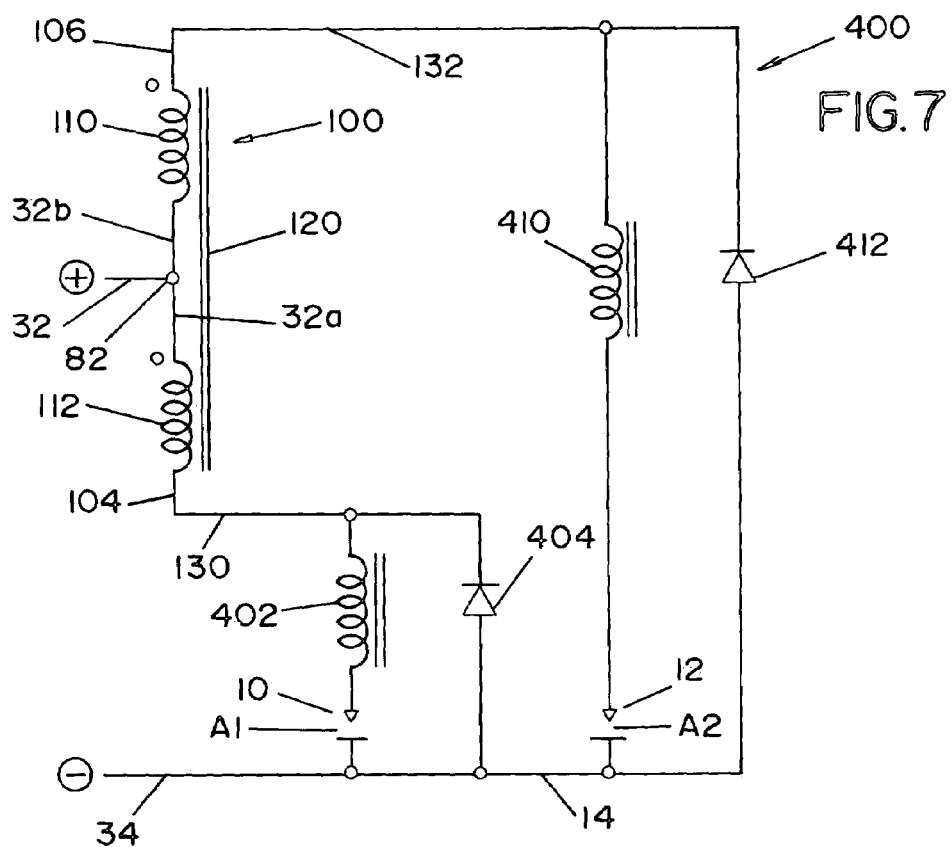
FIG. 7 is a wiring diagram illustrating the preferred embodiment of the invention wherein a center tapped output choke is provided with auxiliary inductors to control total series inductance; and, FIG. 8 is a second embodiment of the present invention wherein the auxiliary inductors are illustrated to be adjustable and the electrodes are shown as driven by separate wire feeders.
Figure 8:
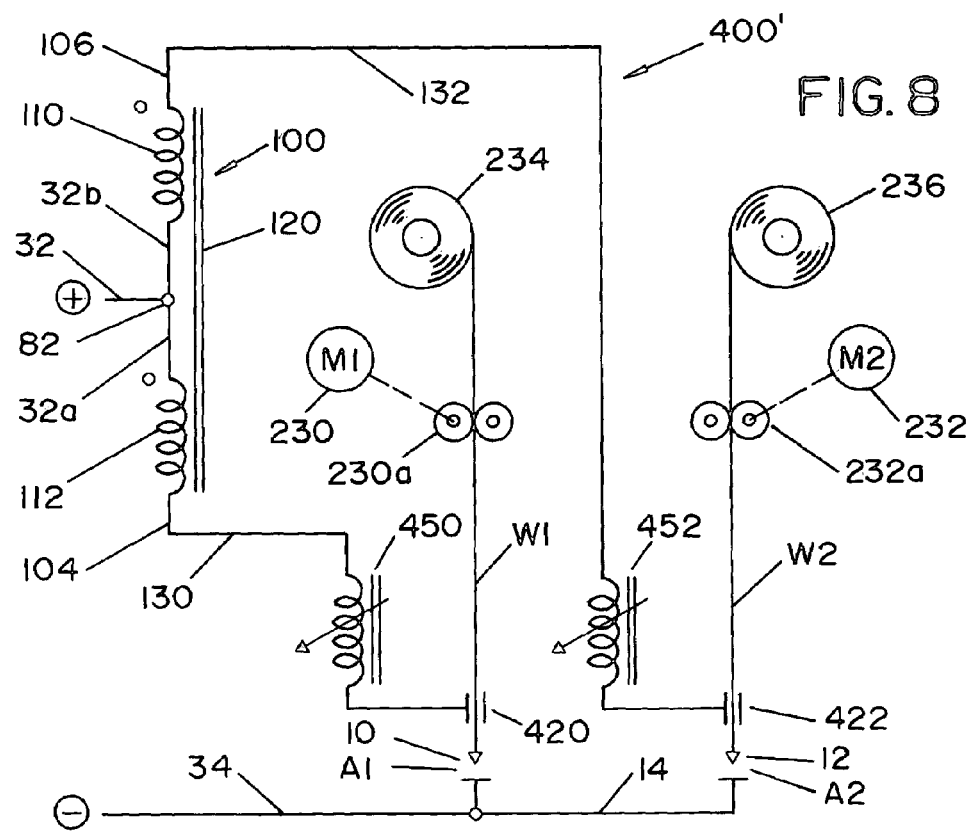

The preferred embodiments of the present invention are illustrated in FIGS. 7 and 8 wherein output leads 130, 132 of center tapped choke 100 provide welding power to system 400 in FIG. 7 and related system 400' in FIG. 8. Turning now to system 400, output lead 130 has a separate auxiliary inductor 402 which is combined with the inductance of coil section 112 to create the desired inductive reactance for the series circuit including arc A1. To stabilize arc A1, a reverse biased freewheeling choke 404 is connected in parallel with the series circuit including auxiliary inductor 402 and arc A1. In a like manner, output lead 132 is directed to a separate auxiliary inductor 410 in series with arc A2. To stabilize arc A2 system 400 includes a reverse biased freewheeling diode 412. In operation of system 400, the arc stabilizing inductance in series with the arcs A1, A2 is the combined inductance of the center choke coil section and auxiliary inductors. Center tapped choke 100 is a standard component for the output of the electric welder and can be used as shown in FIGS. 3 and 4 to control the arc A1, A2 during periods of inadvertent shorting of one of the arcs. The improvement of the present invention is the addition of auxiliary inductors in series with the center tapped choke and the arc. In this manner, a standard center tapped choke is used in practicing the invention, as explained with respect to FIG. 4. To customize the actual inductance in the series circuit controlling the flow of current the invention uses auxiliary inductors. In this manner, the time during which the arc is maintained when the opposite arc is shorted is controlled without altering the construction of a center tapped choke, which is normally a somewhat standardized component of the welder. Furthermore, by using separate auxiliary inductors, a welding operation is tailored or customized after it has been designed and provided with a standard center tapped choke. The choke itself need not be modified each time that there is a desire to affect the stability of the respective arcs. This is a substantial improvement over the center tapped choke system A shown in FIG. 4, even though that system has the overall benefit of the present invention. System 400 merely improves the application and implementation of the concept illustrated in FIG. 4 at a low cost and in a manner to customize the stability of the individual arcs. Electrodes 10, 12, as explained with respect to FIG. 5, are really driven separately by wire feeders 230, 232 for drawing welding wire from spools 234, 236, respectively. Drive rolls 230a and drive rolls 232a pull the welding wire W1, W2 from spools 234, 236, respectively, at a wire feed speed controlled with a signal received by motors M1, M2 of wire feeders 230, 232, respectively. System 400' illustrates the concept of the wire feeder which would be used in system 400 as illustrated in FIG. 5. System 400' differs from system 400 by including adjustable auxiliary inductors 450, 452 instead of fixed inductors 402, 410, respectively. Freewheeling diodes of system 400 are included in system 401 but not illustrated for simplicity. Furthermore, standard contact sleeves 420, 422 for wires W1, W2, respectively, are shown as the connection between the auxiliary inductors and arcs A1, A2, respectively. The broad concept of including current controlling inductive reactance in series with arcs A1, is shown in FIG. 4 as using a center tapped inductor. This concept requires the design of a special center tapped choke for each system A. To improve the circuit of FIG. 4, systems 400, 400' shown in FIGS. 7 and 8 include separate auxiliary inductors in series with the individual arcs to allow changes in the auxiliary inductors when desired to custom develop the inductive reactance for use in stabilizing arcs A1, A2. Furthermore, system 400' allows individual adjustment of inductors 450, 452 themselves for further customizing or trimming the various series inductance of a circuit practicing the concept shown in FIGS. 1–5.

Having thus defined the invention, the following is claimed:

1. A system for welding with a first and second arc between a first and second electrode, respectively, and a common workpiece, where each of said electrodes is driven by a power lead from a single power source, said system comprising: an inductor with a core, a center tap, a first end, a second end, a first coil section between said tap and said first end and a second coil section between said tap and said second end, said power lead being connected to said tap, a first circuit connecting said first arc in series with said first coil section and a second circuit connecting said second arc in series with said second coil section, a first separate auxiliary inductor in said first circuit between said first coil section and said first arc and a second separate auxiliary inductor in said second circuit between said second coil section and said second arc.

2. A system as defined in claim 1 wherein said coils and auxiliary inductors of each series circuit have an inductance to store enough energy to maintain an existing arc associated with one of said electrodes for a selected general time with essentially no current to said one electrode.

3. A system as defined in claim 2 wherein said time is in the general range of 1.0 ms to 10 ms.

4. A system as defined in claim 3 wherein said coils have substantially the same number of turns.

5. A system as defined in claim 4 wherein said coil sections are wound on a common core with a winding polarity of said coil section to cause opposite flux in said common core.

6. A system as defined in claim 5 including a freewheeling diode in parallel with each auxiliary inductor and associated arc.

7. A system as defined in claim 5 wherein at least one of said auxiliary inductors is adjustable in inductance.

8. A system as defined in claim 4 including a freewheeling diode in parallel with each auxiliary inductor and associated arc.

9. A system as defined in claim 4 wherein at least one of said auxiliary inductors is adjustable in inductance.

10. A system as defined in claim 3 wherein said coil sections are wound on a common core with a winding polarity of said coil section to cause opposite flux in said common core.

11. A system as defined in claim 10 including a freewheeling diode in parallel with each auxiliary inductor and associated arc.

12. A system as defined in claim 10 wherein at least one of said auxiliary inductors is adjustable in inductance.

13. A system as defined in claim 3 including a freewheeling diode in parallel with each auxiliary inductor and associated arc.

14. A system as defined in claim 3 wherein at least one of said auxiliary inductors is adjustable in inductance.

15. A system as defined in claim 2 wherein said coils have substantially the same number of turns.

16. A system as defined in claim 15 wherein said coil sections are wound on a common core with a winding polarity of said coil section to cause opposite flux in said common core.

17. A system as defined in claim 16 including a freewheeling diode in parallel with each auxiliary inductor and associated arc.

18. A system as defined in claim 16 wherein at least one of said auxiliary inductors is adjustable in inductance.

19. A system as defined in claim 15 including a freewheeling diode in parallel with each auxiliary inductor and associated arc.

20. A system as defined in claim 15 wherein at least one of said auxiliary inductors is adjustable in inductance.

21. A system as defined in claim 2 wherein said coil sections are wound on a common core with a winding polarity of said coil section to cause opposite flux in said common core.

22. A system as defined in claim 21 including a freewheeling diode in parallel with each auxiliary inductor and associated arc.

23. A system as defined in claim 21 wherein at least one of said auxiliary inductors is adjustable in inductance.

24. A system as defined in claim 2 including a freewheeling diode in parallel with each auxiliary inductor and associated arc.

25. A system as defined in claim 2 wherein at least one of said auxiliary inductors is adjustable in inductance.

26. A system as defined in claim 1 wherein said coils have substantially the same number of turns.

27. A system as defined in claim 26 wherein said coil sections are wound on a common core with a winding polarity of said coil section to cause opposite flux in said common core.

28. A system as defined in claim 27 including a freewheeling diode in parallel with each auxiliary inductor and associated arc.

29. A system as defined in claim 27 wherein at least one of said auxiliary inductors is adjustable in inductance.

30. A system as defined in claim 26 including a freewheeling diode in parallel with each auxiliary inductor and associated arc.

31. A system as defined in claim 26 wherein at least one of said auxiliary inductors is adjustable in inductance.

32. A system as defined in claim 1 wherein said coil sections are wound on a common core with a winding polarity of said coil section to cause opposite flux in said common core.

33. A system as defined in claim 32 including a freewheeling diode in parallel with each auxiliary inductor and associated arc.

34. A system as defined in claim 32 wherein at least one of said auxiliary inductors is adjustable in inductance.

35. A system as defined in claim 1 including a freewheeling diode in parallel with each auxiliary inductor and associated arc.

36. A system as defined in claim 35 wherein at least one of said auxiliary inductors is adjustable in inductance.

37. A system as defined in claim 1 wherein at least one of said auxiliary inductors is adjustable in inductance.

* * * * *